United States Patent
Kumar et al.

(10) Patent No.: US 11,148,676 B2
(45) Date of Patent: Oct. 19, 2021

(54) DETECTION OF AN ANOMALOUS IMAGE ASSOCIATED WITH IMAGE DATA FROM ONE OR MORE CAMERAS OF A COMPUTER-AIDED OR AUTONOMOUS DRIVING VEHICLE

(71) Applicant: Intel Corporation, Santa Clara, CA (US)

(72) Inventors: Avinash Kumar, Santa Clara, CA (US); Sridhar Sharma, Palo Alto, CA (US); Nilesh Ahuja, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 16/369,898

(22) Filed: Mar. 29, 2019

(65) Prior Publication Data

US 2019/0225234 A1    Jul. 25, 2019

(51) Int. Cl.
   *B60W 50/02* (2012.01)
   *G06T 7/00* (2017.01)
   *B60R 11/04* (2006.01)
   *G06K 9/00* (2006.01)
   *G06T 7/80* (2017.01)

(52) U.S. Cl.
   CPC ........ *B60W 50/0205* (2013.01); *B60R 11/04* (2013.01); *G06T 7/0002* (2013.01); *G06T 7/80* (2017.01); *B60W 2050/0215* (2013.01); *B60W 2420/42* (2013.01); *G06T 2207/10021* (2013.01); *G06T 2207/10024* (2013.01); *G06T 2207/10028* (2013.01); *G06T 2207/20076* (2013.01); *G06T 2207/20081* (2013.01); *G06T 2207/20084* (2013.01); *G06T 2207/30168* (2013.01); *G06T 2207/30256* (2013.01)

(58) Field of Classification Search
   USPC ........................................................ 701/29.7
   See application file for complete search history.

(56) References Cited

U.S. PATENT DOCUMENTS

| | | | | |
|---|---|---|---|---|
| 10,242,665 B1* | 3/2019 | Abeloe | ................ | G05D 1/0221 |
| 2013/0147951 A1* | 6/2013 | Brown | ..................... | H04N 5/33 |
| | | | | 348/143 |
| 2015/0286888 A1* | 10/2015 | Maison | ................ | G06K 9/3258 |
| | | | | 382/182 |

(Continued)

*Primary Examiner* — Tyler D Paige
(74) *Attorney, Agent, or Firm* — Schwabe, Williamson & Wyatt, P.C.

(57) ABSTRACT

Embodiments include apparatuses, systems, and methods for a computer-aided or autonomous driving (CA/AD) system to detect an anomalous image associated with image data from one or more cameras of a computer-aided or autonomous driving (CA/AD) vehicle. Embodiments may include a sensor interface disposed in the CA/AD vehicle to receive, from the one or more cameras, a stream of image data including single view image data captured by the one or more cameras or multi-view image data collaboratively captured by multiple ones of the one or more cameras. In embodiments, a consistency analysis unit disposed in the CA/AD vehicle is coupled to the sensor interface to perform a consistency check on pixel-level data using single view or multi-view geometric methods to determine whether the image data includes an anomalous image. Other embodiments may also be described and claimed.

24 Claims, 11 Drawing Sheets

(56) References Cited

U.S. PATENT DOCUMENTS

| | | | | |
|---|---|---|---|---|
| 2017/0372153 | A1* | 12/2017 | Justice | G06K 9/00986 |
| 2018/0048801 | A1* | 2/2018 | Kiser | H04N 5/23238 |
| 2019/0225234 | A1* | 7/2019 | Kumar | G06T 7/80 |
| 2019/0258251 | A1* | 8/2019 | Ditty | G05D 1/0274 |
| 2019/0384294 | A1* | 12/2019 | Shashua | G05D 1/0088 |
| 2020/0184233 | A1* | 6/2020 | Berberian | G06K 9/00798 |
| 2020/0296310 | A1* | 9/2020 | Hicks | G06T 5/001 |

\* cited by examiner

DETECTION OF AN ANOMALOUS IMAGE ASSOCIATED WITH IMAGE DATA FROM ONE OR MORE CAMERAS OF A COMPUTER-AIDED OR AUTONOMOUS DRIVING VEHICLE

FIELD

Embodiments of the present invention relate generally to the field of computer-aided or autonomous driving (CA/AD) vehicles, and more particularly to detecting an anomalous image associated with image data received from one or more cameras of a CA/AD vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Experts predict that approximately 10 million computer-aided or autonomous driving (CA/AD) vehicles may be on the roads within the next few years. Autonomous Driving Vehicles typically have multiple cameras to sense the environment around the vehicles. In an autonomous driving vehicle, the cameras are used to "see" the world and this information is sent to the "brain", i.e., algorithmic/computational blocks for processing. Since cameras are critical to the functioning of an autonomous driving vehicle, any anomaly in a camera's image stream could be problematic, even catastrophic. Due to their criticality in autonomous driving, camera systems become highly susceptible to an attack by a malicious agent e.g., a hacker who can alter the contents of the image stream leading to incorrect behavior of the autonomous driving system. In other situations the camera subsystem may inadvertently be faulty and provide incorrect images. Furthermore, neural networks are known to be vulnerable to adversarial examples i.e., inputs that are close to natural inputs but classified incorrectly. For example, it has been shown that adversarial examples which are cleverly crafted through minor perturbations to input images with a deliberate intention of fooling a Deep Neural Network (DNN), may cause misclassification with a high confidence. For example, the perturbations can be designed such that it is possible to remove a specific class from the segmentation output (e.g. removing pedestrians or cars from the road). These kind of security attacks would result in problematic, even catastrophic results in self-driving vehicles and critical real-world systems. Thus, it can be critical to determine if a DNN has been compromised. Accordingly, it is important to parse input images prior to classification to detect adversarial examples by looking for pixel-level anomalies as well as detect anomalies caused by faulty hardware or software.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
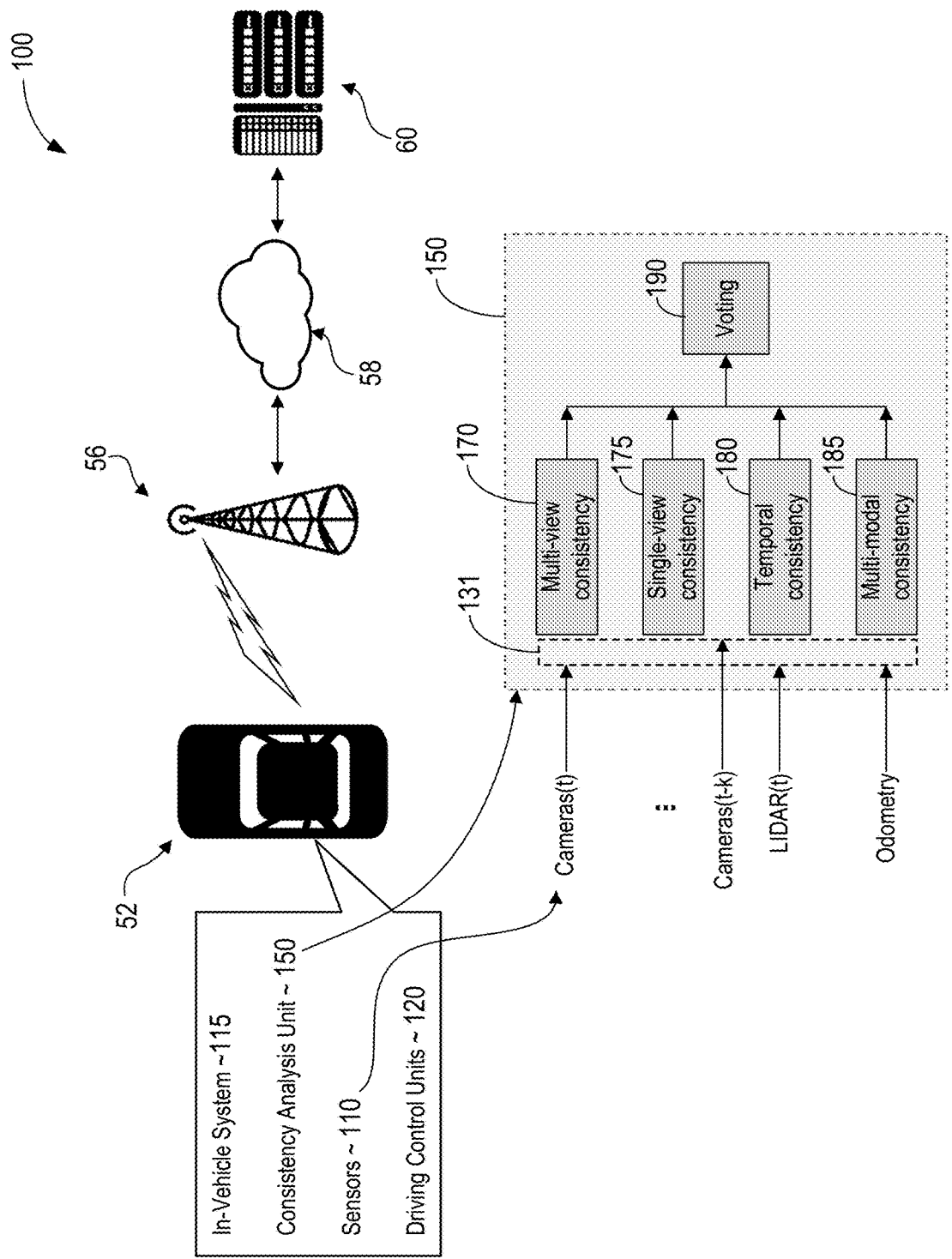
FIG. 1 illustrates a consistency analysis unit 150 associated with a computer-aided or autonomous driving (CA/AD) system of driving vehicle and an environment 100 for implementing the same, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Note also that "proximate" may mean near, on, over, under, attached, coupled to, nearby, surrounding, partially surrounding, or the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors or a computer system having one or more processors. Embodiments described herein include a computer-aided or autonomous driving (CA/AD) apparatus to detect an anomalous image associated with image data from one or more cameras coupled to a computer-aided or autonomous driving (CA/AD) vehicle. In embodiments, the CA/AD apparatus may include a sensor interface disposed in the CA/AD vehicle to receive, from the one or more cameras, a stream of image data including single view image data captured by the one or more cameras or multi-view image data collaboratively captured by multiple ones of the one or more cameras. In embodiments, a consistency analysis unit disposed in the CA/AD vehicle is coupled to the sensor interface to perform a consistency check on pixel-level data using single view or multi-view geometric methods to determine whether the image data includes an anomalous image.

Referring now to FIG. 1, which illustrates a consistency analysis unit 150 to implement the detection and analysis technology of embodiments of the present disclosure. FIG. 1 also provides an overview of an environment 100 for implementing the same. As shown, for the illustrated embodiments, environment 100 includes vehicle 52 having one or more of an engine, electric motor, braking system, drive system, wheels, transmission, a battery, and so forth. In embodiments, vehicle 52 is a computer-assisted or autonomous driving (CA/AD) vehicle. Further, vehicle 52 includes a CA/AD system including an on-board computer including and/or coupled to an in-vehicle system 115 having a number of subsystems/applications, e.g., instrument cluster subsystems/applications, front-seat infotainment subsystems/applications, such as a navigation subsystem/application, a media subsystem/application, a vehicle status subsystem/application and so forth, and a number of rear-seat subsystems/applications. Further, CA/AD system is provided with or coupled to a CA/AD consistency analysis unit 150 of the present disclosure, to perform a consistency check on pixel-level data using single view or multi-view geometric methods to determine whether image data includes an anomalous image.

Still referring to FIG. 1, vehicle 52 includes sensors 110 and driving control unit(s) 120 that may be included in the CA/AD system. In embodiments, the driving control unit(s) 120 may further include or be coupled to an image signal processor (ISP), one or more processors to process sensor data, fuse sensor data, detect objects, track dynamic objects over time, determine a drivability map and motion planning units (not shown) that receive and process outputs of consistency analysis unit 150. In embodiments, as shown, sensors 110 include cameras such as, e.g., vision-based cameras, as well as other types of cameras coupled to the vehicle, e.g., CA/AD vehicle, to capture image data proximate to the CA/AD vehicle. In embodiments, other cameras or sensors are based on radar, light detection and ranging (LIDAR), odometry sensors and GPS data. In various embodiments, sensors may also include microphones, accelerometers, gyroscopes, inertia measurement units (IMU), engine sensors, drive train sensors, tire pressure sensors, and so forth. In some embodiments, sensors 110 are configured to provide various sensor data to consistency analysis unit 150. In embodiments, driving control unit 120 include electronic control units (ECUs) that control the operation of the engine, the transmission the steering, and/or braking of vehicle 52.

In some embodiments, a sensor interface 131 is integrated or disposed in the vehicle 52 to receive, from the one or more cameras or sensors, a stream of image data including single view image data captured by the one or more cameras or sensors. In embodiments, sensor interface 131 also receives multi-view image data collaboratively captured by multiple ones of the one or more cameras or sensors. In embodiments, consistency analysis unit 150 is disposed in the CA/AD vehicle and coupled to the sensor interface. As shown in the embodiments, consistency analysis unit 150 may perform one or more consistency checks, such as, for example, multi-view consistency check 170, single-view consistency check 175, temporal consistency check 180, and/or multi-modal consistency check 185. Note that in some embodiments, temporal consistency check 180, and/or multi-modal consistency check 185 are sub-sets of multi-view consistency check and single-view consistency check 175.

In embodiments, consistency analysis unit 150 determines whether the image data includes the anomalous image (due to either an adversarial attack or faulty hardware or software), based at least in part on a value that is a weighted value $w_i$ between 0 and 1 corresponding to a confidence score and is assigned to an output of a corresponding consistency check. In embodiments, these weights are determined by a learning based approach and/or a ground truth set of anomalous and/or non-anomalous labeled images. In embodiments, the combined weighted value from all the consistency check blocks in 170, 175, 180 and 185 is determined statistically in a block 190, such as by a weighted combination of confidence scores where the weights are determined by linear regression or by logistic regression. In various embodiments, the weights are determined by a support vector machine (SVM) classifier that takes in as inputs the individual confidence scores and returns a Boolean decision (anomaly present/not-present) or by a single-layer or multi-layer perceptron or other neural network. In embodiments, this combined global score indicates confidence of an anomaly. In embodiments, the outputs of the consistency checks 170, 175, 180, and 185 may be compared via a voting block mechanism or some combinatorial logic at block 190 to determine if an anomaly is present or not.

In some embodiments, in-vehicle system 115, on its own or in response to user interactions, may communicate or interact with one or more off-vehicle remote servers 60, via a wireless signal repeater or base station on transmission tower 56 near vehicle 52, and one or more private and/or public wired and/or wireless networks 58. Servers 60 may be servers associated with a manufacturer of the CA/AD vehicle (e.g., vehicle 52) or other remote organization associated with CA/AD vehicles and/or navigation thereof. Examples of private and/or public wired and/or wireless networks 58 may include the Internet, the network of a cellular service provider, and so forth. It is to be understood that transmission tower 56 may be different towers at different times/locations, as vehicle 52 en route to its destination.

These and other aspects of consistency analysis unit 150 will be further described with references to the remaining Figures. For the purpose of this specification, one or more vehicles 52 may also be referred to as a CA/AD vehicle(s).

Note further that for illustrative purposes, the following description has been provided illustrating vehicle 52 as a passenger car in a roadway environment. However, the embodiments described herein are also applicable to any type of vehicle, such as trucks, buses, motorcycles, boats or motorboats, and/or any other motorized devices that may benefit from a CA/AD driving system as described in connection with the disclosure. For example, water vehicles such as boats, speedboats, ferries, barges, hovercrafts, other water vehicles etc., may also benefit from consistency analysis unit 150. The embodiments described herein may also be applicable within the spirit of the described embodiments to flying objects, such as space rockets, aircraft, drones, unmanned aerial vehicles (UAVs), and/or to any other like motorized devices that may benefit from identification of an audio signal that may be included in surrounding sounds proximate to such motorized devices.

Figure 2:
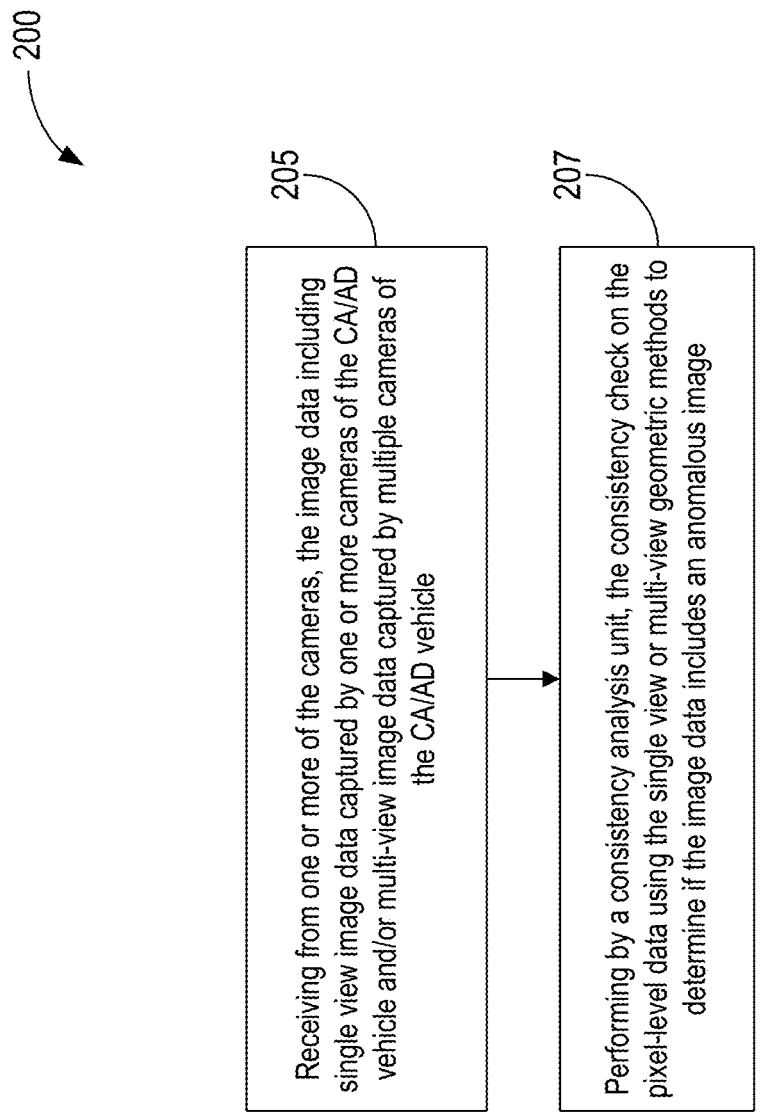
FIG. 2 is a flow diagram 200 illustrating a process 200 performed by or associated with FIG. 1, in accordance with various embodiments.

FIG. 2 is a flow diagram further illustrating a process 200 performed by or associated with the consistency analysis unit of FIG. 1, in accordance with various embodiments. In embodiments, at a block 205, the embodiment includes receiving by the consistency analysis unit, from one or more of the cameras, the image data including single view image data captured by one or more cameras of the CA/AD vehicle and/or multi-view image data captured by multiple cameras of the CA/AD vehicle. Next, at a block 207, method 200 includes performing by the consistency analysis unit, the consistency check on the pixel-level data using the single view or multi-view geometric methods to determine if the image data includes an anomalous image.

As noted in connection with FIG. 1, an output from each of the consistency checks may be a Boolean true/false (anomaly present/not-present) indicator or a weighted value $w_i$ between 0 and 1 representing a confidence score. In embodiments, the weight for each block will signify how accurate the consistency check method is in the presence of noise. In embodiments, the weight can be computed via various methods like theoretical analysis or statistical analysis over a number of noisy synthetic images without anomaly. In some embodiments, the weights are normalized over all the methods of consistency check and compared to a predetermined threshold, rather than a voting mechanism in order to determine whether an anomaly exists in image data. In embodiments, voting block weights are computed empirically or statistically or in other embodiments by a neural network, e.g., single or multi-layer perceptron, or a support vector machine (SVM). In various embodiments, the weights related to the different consistency checks are determined via learning from ground truth anomalous example images or examples associated with ground truth anomalous images and which indicate a likelihood of accuracy of the consistency checks.

Figure 3:
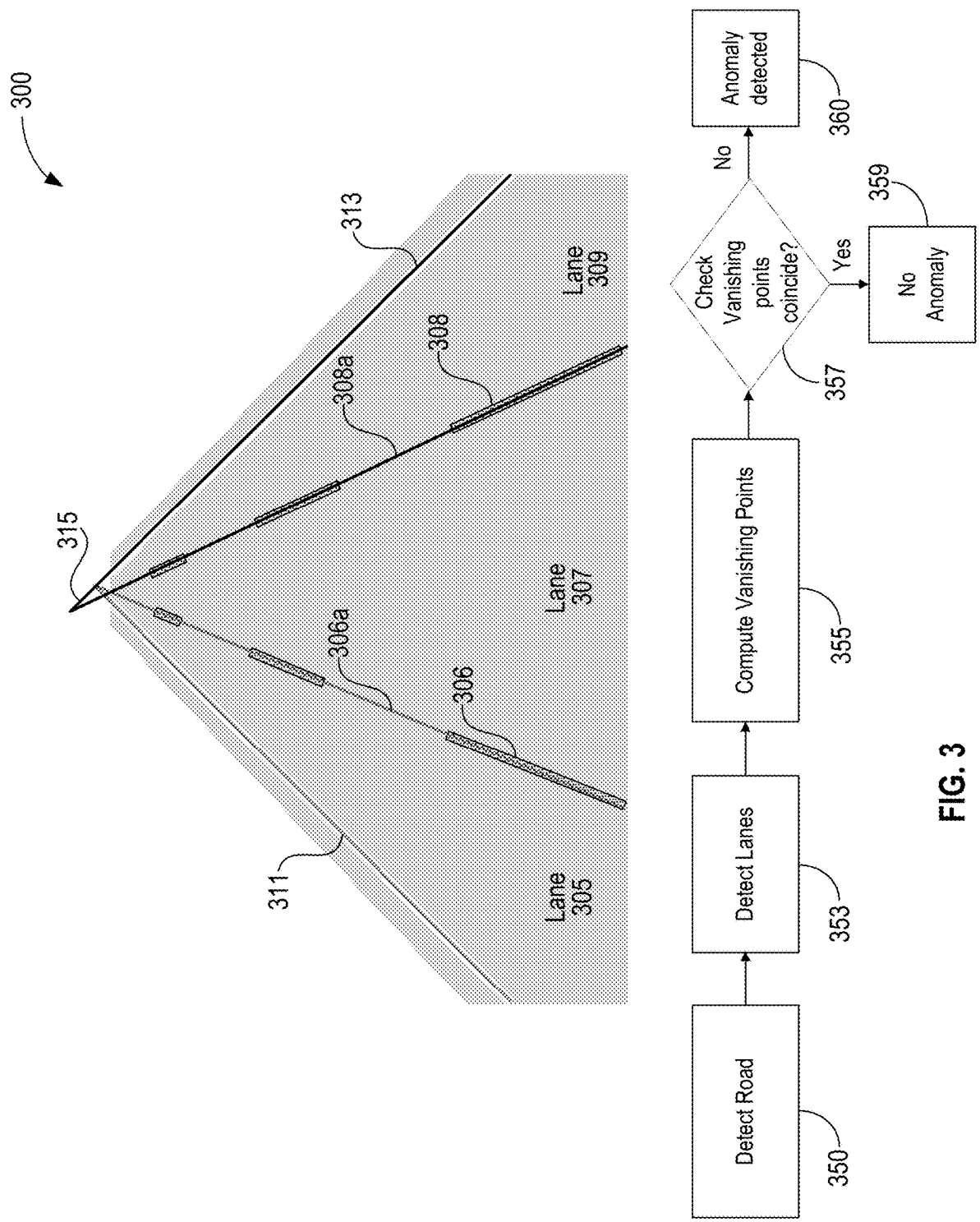
FIG. 3 is a diagram of a road 300 and corresponding flow diagram 350 illustrating in further detail, embodiments associated with the consistency analysis technology of FIGS. 1 and 2, in accordance with various embodiments.

Next, FIG. 3 is a diagram of a road 300 and corresponding flow diagram 350 illustrating in further detail, embodiments associated with the consistency analysis technology of FIGS. 1 and 2. FIG. 3 illustrates embodiments associated with a single-view or single image geometric method. In various embodiments, the consistency check to be performed by, e.g., consistency analysis unit 150 of FIG. 1, and is based on single view image data and is based at least in part upon detection of lines indicated by pixel-level data associated with a stream of image data. For example, FIG. 3 illustrates detection of inconsistencies, e.g., such as pixel-level data indicating parallel lines that should converge to a vanishing point but do not converge as expected. As shown in the embodiment, road 300 includes one or more lanes, e.g., three lanes, e.g., 305, 307, and 309. Road 300 is marked by inner lane markers 306 and 308 (for clarity in the Figure, only two inner lane markers are labeled) as well as outer shoulder lines 311 and 313, for the embodiment. In the example, inner lane markers 306 and 308 follow respective lines 306*a* and 308*a*. In the embodiment illustrated, according to pixel-level data, at a block 350, consistency analysis unit (also referred to as "unit") detects road 300 at block 350. At a next block 353, in the embodiment, the unit detects lanes 305, 307, and 309 by detecting one or more lane markers 306 and 308 as well as outer shoulder lines 311 and 313. At a next block 355, in the embodiments, the unit computes a location of where vanishing points should appear.

Accordingly, in the embodiment, at a decision block 357, the unit checks whether all or substantially all the vanishing point(s) indicated by the pixel-level data coincide. Lines 306*a* and 308*a* that are substantially parallel should have a common vanishing point in the 3D world. In embodiments, if the vanishing points coincide, the answer is YES at 357 and accordingly, no anomaly detected at block 359 and the process returns to detecting the road at 315. In the alternative at block 357, if the vanishing points do not coincide, the answer is NO because lines 306*a*, 308*a*, 311, and 313, intersect at different points (see 315) according to the pixel-level data. Thus, an anomaly is detected at block 360. In embodiments, the anomaly indicates that the image data may be intentionally distorted for one or more of lanes 305, 307 and 309. Note that in embodiments, the anomaly detected may have been introduced via insertion of synthetic images or full-frame sub images into an image stream. Accordingly, in embodiments, results of the consistency check are provided to a voting mechanism block, e.g., 190 of FIG. 1. Note that the example of FIG. 3 is merely illustrative and detection of anomalies include those associated with any path or road and include any suitable number of lanes, markers, marker-types, road-markers (or lack of markers). Accordingly, in the embodiment shown, inner lane markers 306 and 308 are non-contiguous lines but in other embodiments, may be continuous lines such as 306*a* and 308*a*.

Figure 4:
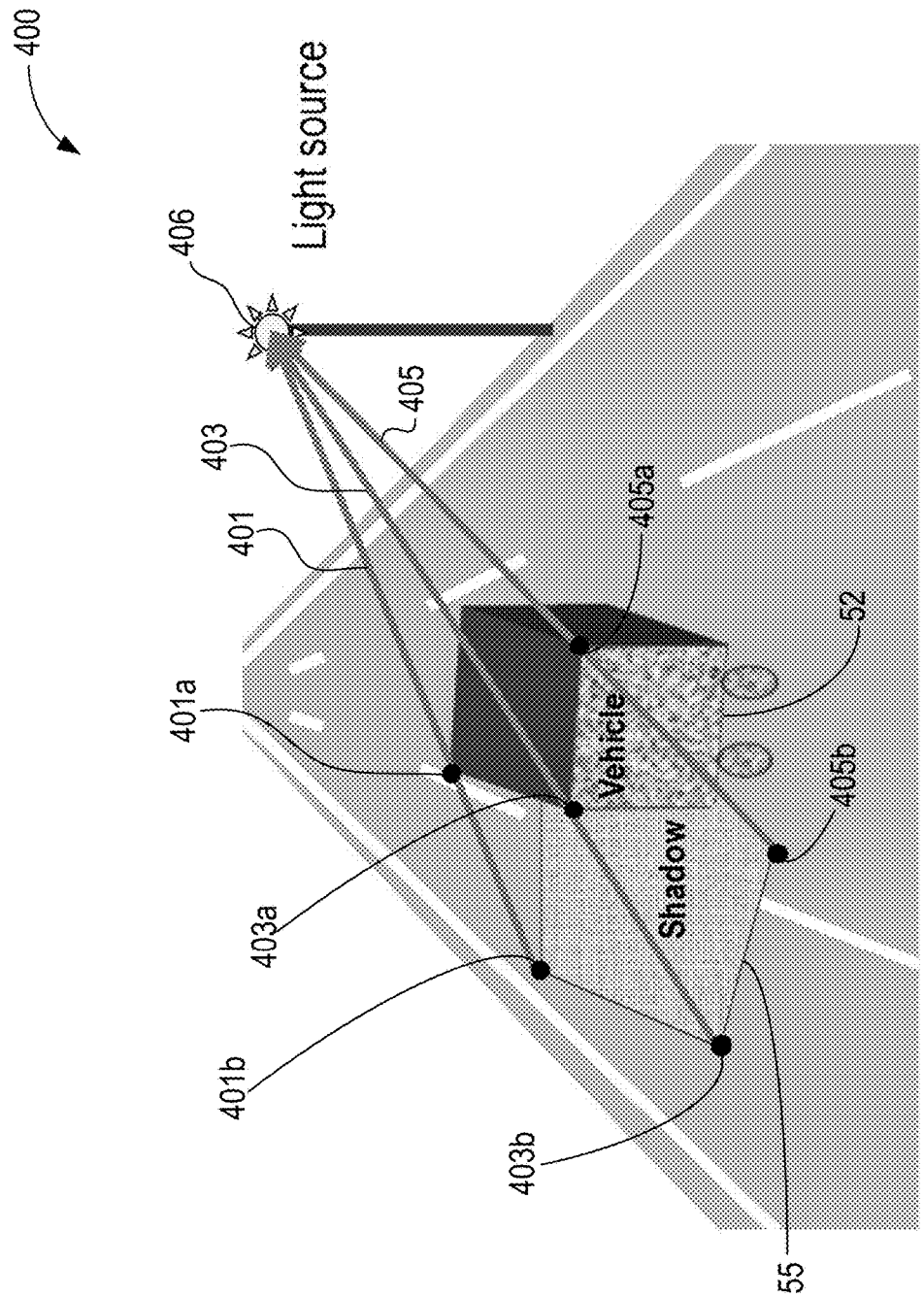
FIG. 4 is a diagram 400 illustrating in further detail, additional embodiments associated with the consistency analysis technology of FIGS. 1 and 2, in accordance with various embodiments.

Other example embodiments of consistency checks include shadow consistency checks as shown in FIG. 4. In embodiments, a shadow consistency check includes computing two dimensional (2D) lines that are to connect corners of an object and its shadow. Lines associated with shadows ideally converge to a fixed point in 2D image data. Accordingly, embodiments include verifying that a fixed point corresponds to a light source, e.g., a path of light from the light source or light sources, and/or is consistent with the correct number of light sources indicated by image data. For example, FIG. 4 illustrates a road 400 and a vehicle 52 and its shadow 55. In the example illustrated, lines 401, 403 and 405 correspond to, e.g., light rays, from a light source 406. In the embodiment, line 401 should connect corresponding corner 401*a* of vehicle 52 to shadow corner 401*a* on surface of road 400. Similarly, line 403 should connect corresponding corner 403a of vehicle 52 to shadow corner 403B on surface of road 400; line 405 should connect corresponding corner 405a of vehicle 52 to shadow corner 405B on surface of road 400. Accordingly, in embodiments, if various image data related to shadows are not consistent, the image data may indicate an anomaly.

Furthermore, embodiments include detecting various anomalies introduced directly at an image signal processor (ISP) level. In embodiments, an ISP is coupled to the consistency analysis unit and the consistency analysis unit performs a consistency check by comparing color statistics of a raw BAYER pattern image of the pixel-level data and a BAYER pattern image generated by the ISP. In some examples, a malicious agent could introduce noise in various ISP parameters to subtly alter a final RGB image generated by the ISP. Accordingly, in embodiments, the consistency analysis unit approximately inverse maps the post-ISP generated RGB image to its source or raw BAYER pattern. In one exemplary embodiment, this is accomplished by dropping two channels at each pixel location such that the channels confirm to the camera's Bayer pattern. Other exemplary embodiments include to perform simple demosaicing to convert the BAYER image to an RGB/YUV image so that the ISP output and input can be compared. In other embodiments, the statistics of the approximated BAYER pattern raw image are compared with the statistics of the ground truth raw BAYER image. Other embodiments include detecting an anomaly in image data that may be introduced at a time of or during an automotive Ethernet transfer. In embodiments, pixel-level data including a raw image capture is sent along with a post-ISP generated RGB image as a pair of channels across an automotive Ethernet connection. In embodiments, the post-ISP generated RGB image at a receiver end is compared with a synthetically ISP processed received RAW image. In embodiments, a discrepancy would indicate that the RGB image has been tampered with while in transfer through the automotive Ethernet connection in a car chassis.

Figure 5:
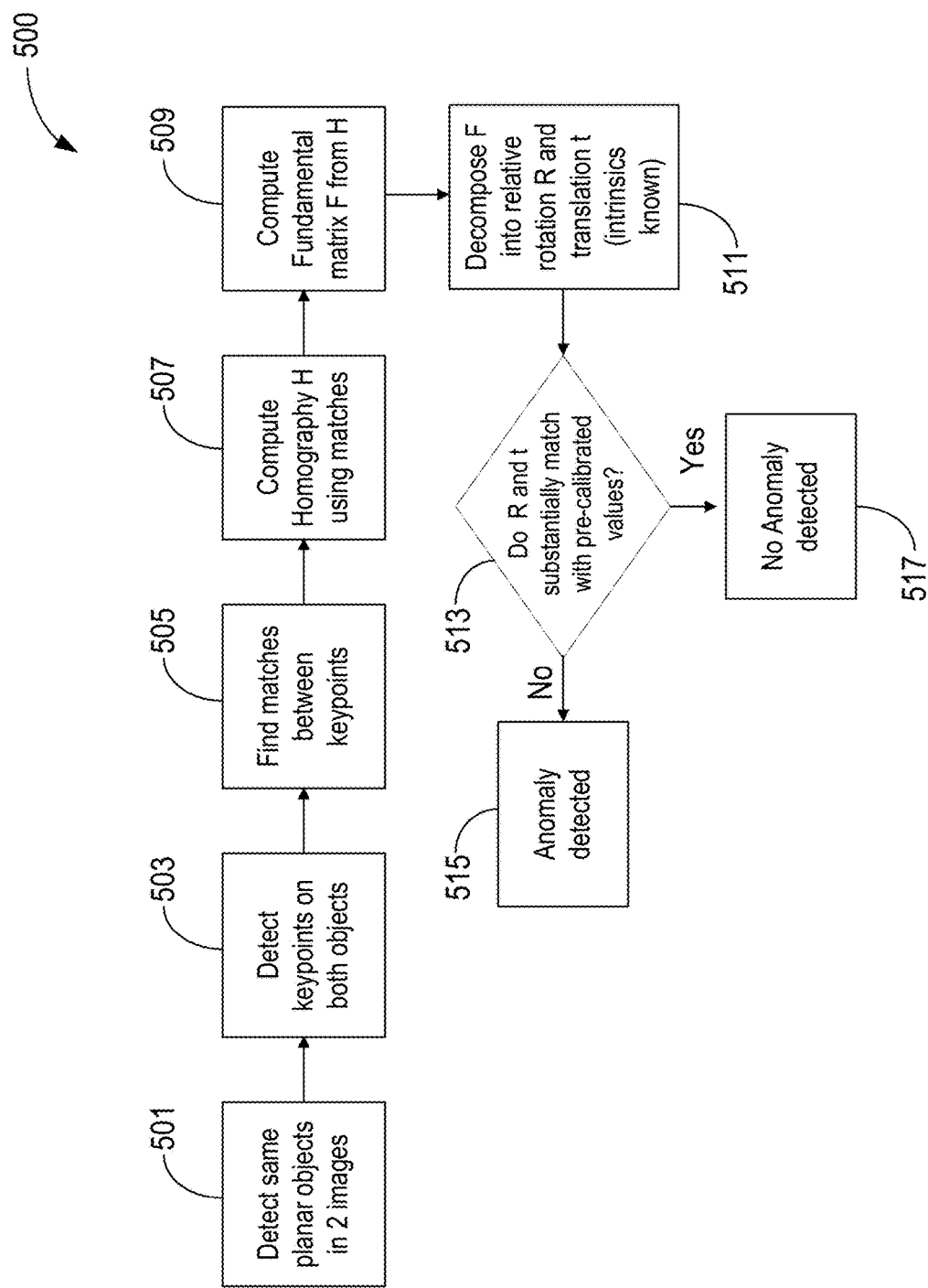
FIG. 5 is a process 500 including embodiments associated with multi-view geometric methods in accordance with various embodiments.

Referring now to FIG. 5 which is a process 500 including embodiments associated with multi-view geometric methods and includes comparing image data related to a common object included in a common field of view of at least two cameras of multiple cameras coupled to an autonomous vehicle. In the embodiment of process 500, comparing image data related to a common object includes comparing a relative rotation and translation parameter determined from image data from at least two cameras to rotation and translation parameters intrinsic to the at least two cameras. For example, in the embodiment, beginning at a block 501, the consistency analysis unit, e.g., 150, of FIG. 1 detects a same object, e.g., a planar object, in two images or two image frames of image data. For example, the object may be a STOP sign having a planar surface. In some scenarios, a location of the STOP sign may have been manipulated in one of the images. In embodiments, a plane projective transformation such as homography is used to detect the anomaly. Accordingly, for example, at block 503, keypoints are detected on both objects in the two images. Note that in embodiments, keypoints may be any suitable points on the objects, e.g., a corner, intersection, or other distinguishing point on the objects. At a block 505, in embodiments, the consistency analysis unit finds or determines matches between the keypoints. At a next block 507, for the embodiment, the consistency analysis unit computes a homography H between the images. In embodiments, at a block 509, the consistency analysis unit computes, a fundamental matrix F from homography H (note that calculation of fundamental matrix F of two images given image data including image coordinates is known and will not be described here). At a next block 511, for the embodiment, the F matrix is decomposed into a relative rotation R and translation t. Note that in embodiments, block 511 is predicated on the cameras being calibrated. At a next block 513, the relative rotation R and translation t are compared with pre-calibrated values for the two cameras. In embodiments, the pre-calibrated values of the two cameras are provided by the autonomous vehicle manufacturer. If the values do not substantially match, an anomaly is detected at a block 515, in the embodiment. If the values do substantially match, an anomaly is not detected at a block 517, in the embodiment. Accordingly, in embodiments, results of the consistency check are provided to a voting mechanism block, e.g., 190 of FIG. 1.

Figure 6:
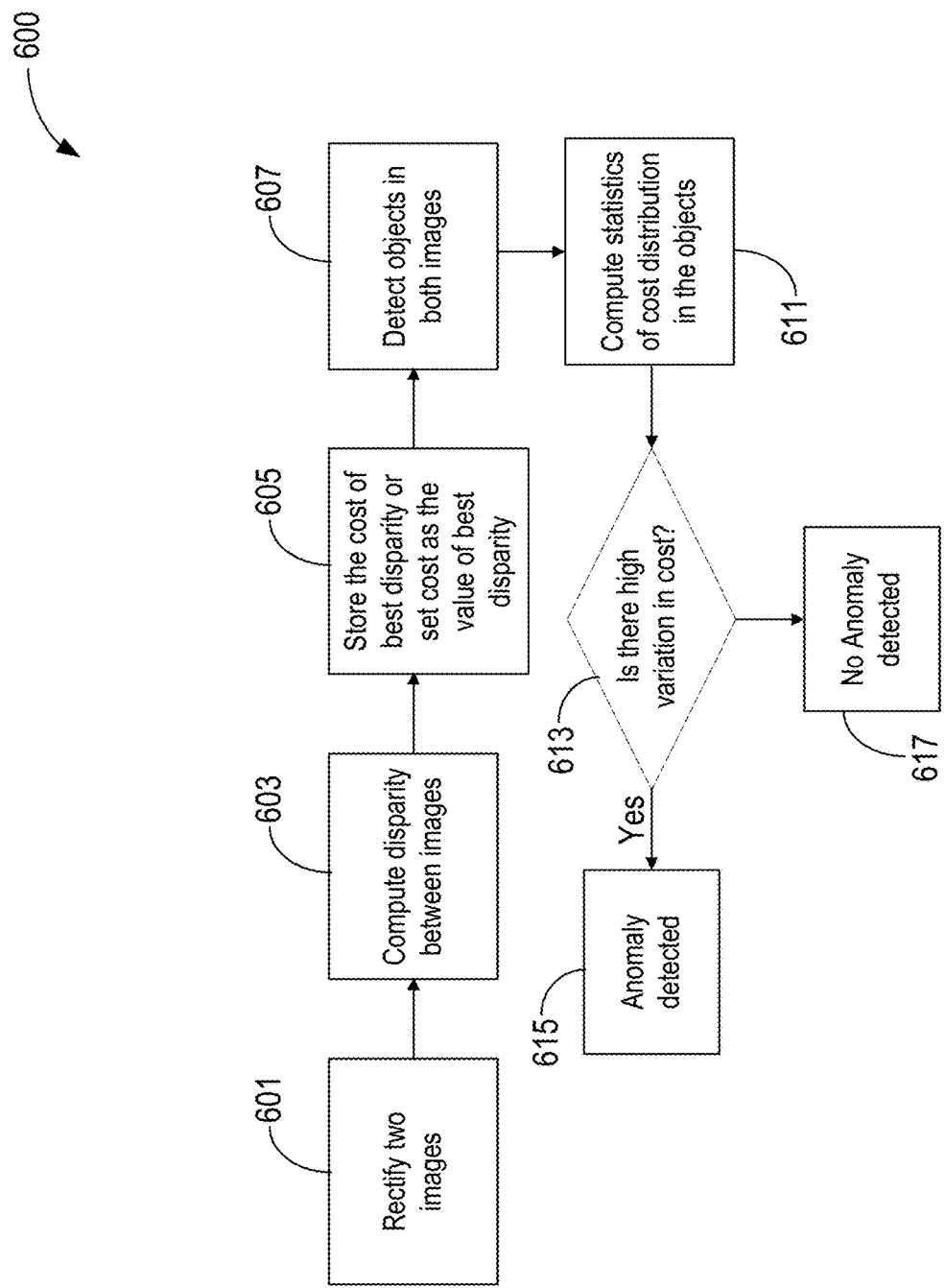
FIG. 6 illustrates an embodiment of a process 600 implementing a disparity-based metric, in accordance with various embodiments.
Figure 7:
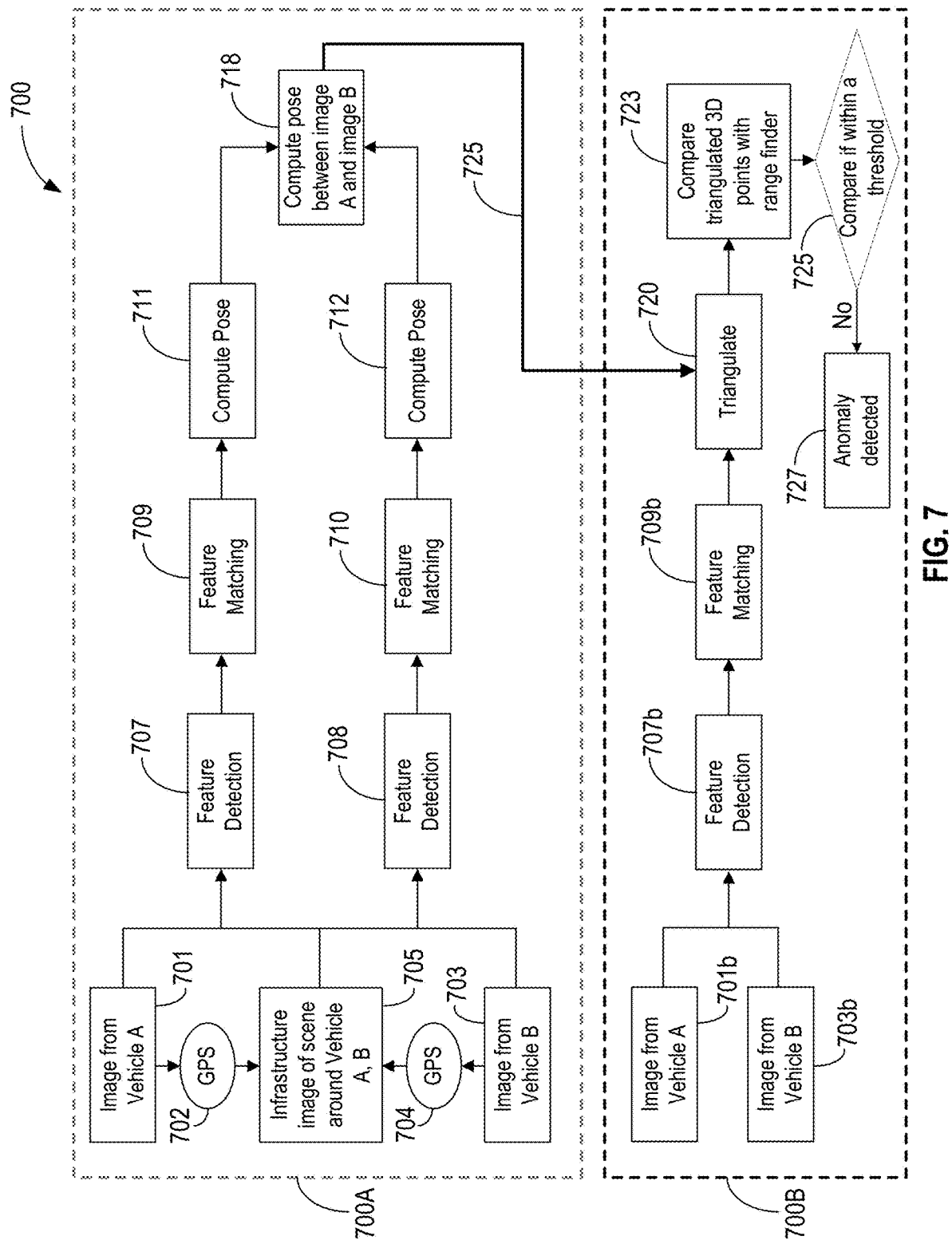
FIG. 7 is a flow diagram of a process 700 illustrating additional embodiments associated with performing a consistency check in accordance with various embodiments.

In various other embodiments, a more generic and scene content independent method may be applied. For example, FIG. 6 illustrates an embodiment of a process 600 implementing a disparity-based metric. Beginning at a block 601 in embodiments, two images or frames of image data are rectified. In embodiments, the two images are from each of two pre-calibrated cameras and are rectified such that their epipolar lines are parallel. Next, at a block 603, in embodiments, the consistency analysis unit computes a disparity between the two images. For example, in embodiments, a disparity cost is computed for all pixels in left and right rectified images along the epipolar lines. Thus, when comparing d disparities, each pixel location in the left image has d disparity cost values. In embodiments, at a next block 605, the cost of the better or best disparity is stored (e.g., the least of d cost values). In embodiments, the cost of the best disparity match for all pixels in the left image and their corresponding matched pixel in the right image is computed and stored as a matrix. Next in the embodiment, at a block 607, the same objects in both images are detected. At a next block 611, statistics of a cost distribution related to each corresponding left-right pair of object are computed for the embodiment. For example, the statistics of cost distribution in pre-detected object regions are computed. At a block 613, if the variation in cost is high, e.g., over a predetermined threshold, the answer is YES, and process 600 moves to block 615 where it is determined that an anomaly is detected. In the alternative, if at block 613, the variation is not high, the answer is NO, and no anomaly is detected at block 617. Note that a region of high variation in the matrix might signify that a match found for objects in that region is erroneous and thus the objects are not actually the same objects. In various other embodiments, a cost of minimum disparity could be replaced by a value of computed minimum disparity in block 605 and used as a cost.

Note that in embodiments, processes 500 and 600 are complementary techniques. In process 500, the original image data are first processed, via a Homography computation, followed by design of a metric based on checking consistency of calibration parameters. In process 600, in contrast, known calibration parameters are first used to rectify a pair of images or image data, followed by a metric designed by processing these images.

In another embodiment, multiple Homography hypotheses from quadruple subsets of matching correspondences lying on a planar 3D object can be used to compare a variation in the parameters of all the Homography matrices. In embodiments, an anomalous image having a perturbed image of a 3D object typically causes significant variation across different computed homographies and could signal a presence of an anomalous image.

In some embodiments, performing a consistency check includes analyzing and comparing image data received from more than two cameras. In embodiments, performing a consistency check includes detecting anomalies by comparing a first 3D reconstruction determined from first multi-view image data with a second 3D reconstruction determined from second multi-view image data. For example, in embodiments, a subset of multi-camera images is used to perform a 3D reconstruction of an object of interest common to other subsets of multi-camera images. In embodiments, if one of the images in the subset is anomalous, the 3D reconstruction will deviate from an ideal or projected reconstruction. In embodiments, the 3D reconstruction may be repeated for a collection of the subsets of the multi-camera images to check a consistency of the 3D reconstructions. In embodiments, such a consistency check may be done with a minimum of subsets or by creating an overdetermined system and using least squares. In embodiments, if substantially all 3D reconstructions of the same reference frame are not similar, there may be an anomalous set of image data in the multi-camera image set.

In various other embodiments, a consistency analysis unit is to perform the consistency check by matching a feature location determined from the image data to feature location determined from GPS data. For example, in embodiments, image data from a camera stream and an earth-viewing satellite image of vehicle surroundings (according to GPS location known for the vehicle), are used compute feature matches between objects in the two images and triangulate points (in the vehicle coordinate system) on the object assuming both the cameras are well calibrated. In embodiments, the triangulated 3D points should confirm to ground truth measurements either computed from a range finder on the vehicle or from a stereo pair of non-anomalous cameras on the vehicle.

Figure 8:
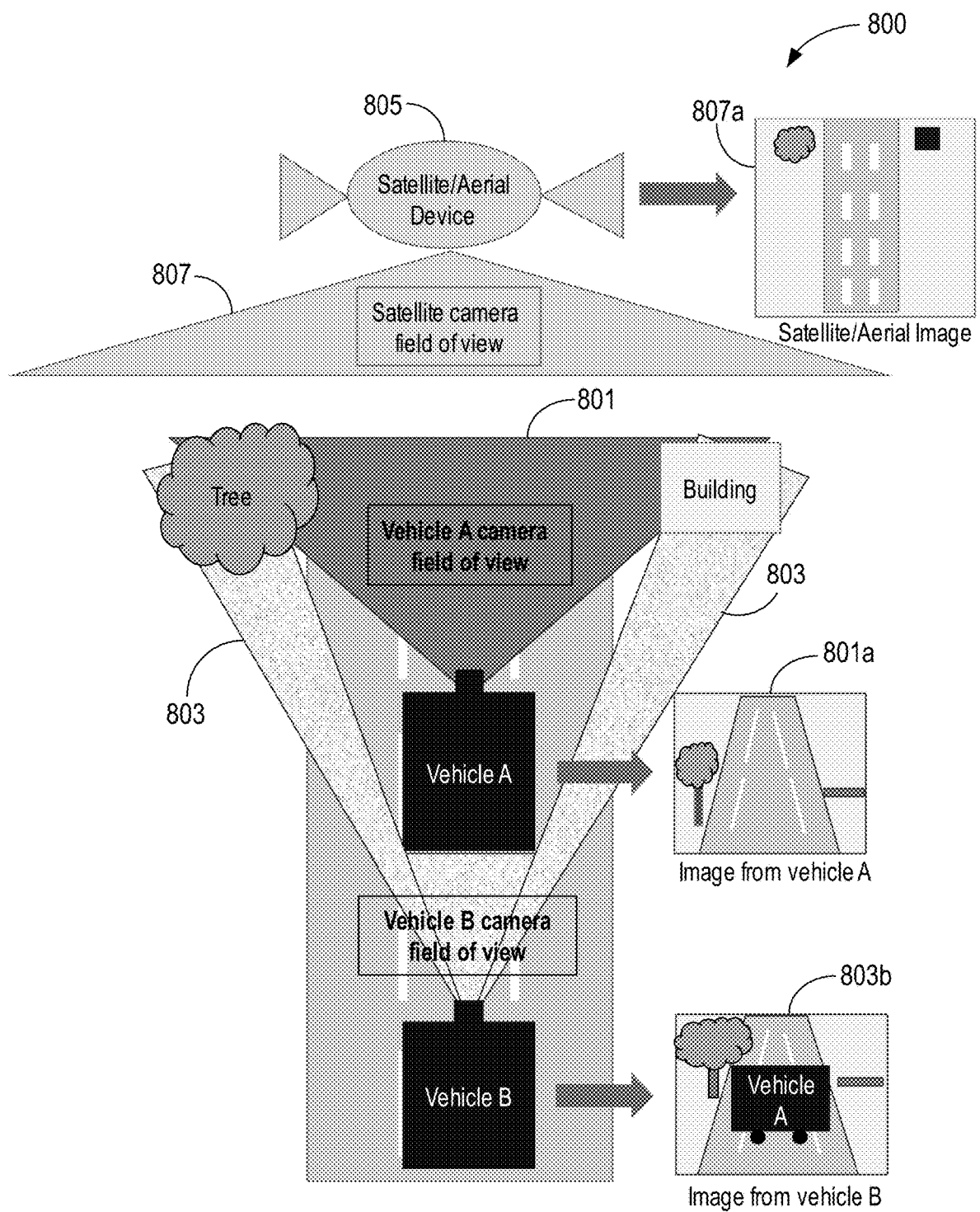
FIG. 8 is a diagram 800, in accordance with various embodiments.

Accordingly, flow diagram 700 in conjunction with FIG. 8 illustrates embodiments associated with performing a consistency check using image data received from a camera of one vehicle, image data received from a camera of at least one other vehicle, and position data, e.g., as received from a satellite/aerial device (hereinafter "satellite"). Note that in various embodiments, communication of images from another vehicle may enhance a vehicle's image data of its surrounding environment. FIG. 8 illustrates a Vehicle A having a field of view 801 associated with image data or image 801A, Vehicle B having a field of view 803 associated with image data or image 803A and satellite/aerial device 805 having a field of view 807 associated with satellite image 807A, For example, where a vehicle B is behind a large vehicle A, most of vehicle B's view may be occluded. Accordingly, in embodiments, vehicle A located in front of vehicle B can provide image data to vehicle B. An image from a camera mounted or otherwise coupled to Vehicle A, however, can be corrupted by external agents, e.g. over wireless communication, and may include anomalies and represent an incorrect environment, thus creating a hazardous scenario for Vehicle B. Accordingly, embodiments further include to compare satellite image data to image data from the vehicle and/or image data received from the at least one other vehicle.

Accordingly, in addition to the single view image consistency checks of FIG. 3 (and/or multiple view image consistency checks of FIG. 5), a satellite image may be used as an additional source of verification. For example, in the embodiment of upper section 700A of flow diagram 700, the consistency analysis unit receives an image from a camera of Vehicle A, e.g., a front-facing camera of Vehicle A, at block 701. In the embodiment, as shown at block 703, the consistency analysis unit also receives an image from a camera of Vehicle B, e.g., a front-facing camera of Vehicle B, at block 703. In embodiments, a satellite image is received by the consistency analysis unit of areas surrounding Vehicle A at block 702 and Vehicle B at 704 to determine an infrastructure image 705 of a scene around Vehicle A and Vehicle B. In embodiments, features in image data from Vehicle A, Vehicle B, and the satellite image are detected at blocks 707 and 708. At blocks 709 and 710, the features are matched. In embodiments, matching keypoints between the corresponding images from Vehicle A, Vehicle B, and the satellite image are computed and stored. At blocks 711 and 712 for respective Vehicle A and Vehicle B, the consistency analysis unit uses the stored keypoint matches to compute the Fundamental Matrix F and then the relative pose (R, t) between Vehicle A and the satellite camera and Vehicle B and the satellite camera. In embodiments, it is assumed that all cameras from which the image data comes, are calibrated. Accordingly, at block 718, in embodiments, the consistency analysis unit, using the satellite camera as a reference, then computes the relative pose between the images of the cameras of Vehicle A and Vehicle B.

In embodiments, moving to section of flow chart 700B, features in the stored images between Vehicle A using image data from Vehicle A at block 701B and Vehicle B at block 703B are detected at block 707B. Next, in the embodiment, feature matching is performed at block 709B. At a block 720, using stored feature matches between the image data from Vehicle A and Vehicle B and the relative pose computed in block 718 of the upper section 700A of flow chart 700, the matches are triangulated to obtain 3D keypoint locations at block 723. In embodiments, accuracy of the 3D point locations are verified with a range finder e.g., a LIDAR camera on Vehicle A. In embodiments, at a next block 725, the keypoint differences are compared. If the differences are not within a predetermined or other threshold, an anomaly is detected at a block 727. Accordingly, in embodiments, results of the consistency check are provided to a voting mechanism block, e.g., 190 of FIG. 1.

Note that in various other embodiments, the consistency analysis unit may perform a temporal consistency check, e.g., temporal consistency check 180 of FIG. 1, to detect an anomaly in a sequence of images received from one or more cameras. The anomaly may be due to a dropping or intentional removal or incorrect synchronization of image frames of data. In embodiments, an analysis for inconsistencies of pixel-level data may include detecting a change in a gradient of pixel locations of keypoints associated with a stream of image data. For example, in embodiments, a profile of 2D pixel locations of distinctive keypoints across an image frame set from a single camera is analyzed. If image frames have been or are being dropped, a sudden change in the gradient of the profile signal will indicate frame drops.

Another embodiment includes to compare a temporal gradient profile of a same keypoint that is visible in the multiple ones of the one or more cameras. Furthermore, in embodiments, an incorrect synchronization can be detected by the disparity based technique described in connection with FIG. 5.

Additional embodiments include to analyze a transformation of a shape of an object according to a speed and direction of a vehicle, e.g., a computer-aided or autonomous driving (CA/AD) automobile, including a CA/AD system. For example, in embodiments, an optical flow across time-sequenced images of image data is used to segment planar objects and their corresponding shape transformation is correlated with vehicle motion direction. In embodiments, such a method may include a multi-modal consistency check, e.g., multi-modal consistency check 185 of FIG. 1. In embodiments, the method assumes perspective projection of the object on a camera image plane. In embodiments, the computation also assumes that a speed and direction of the vehicle are known substantially accurately from an inertial sensor. In embodiments, the surface normal (3D depth) is pre-computed in a reference image (time t=0). According to some embodiments, any deviation in an expected transformation of object shape indicates presence of a single or multiple anomalous image(s) in the time-sequence. In embodiments, the reference image is the first image in the sequence and is updated periodically.

In another embodiment, the consistency analysis unit detects an anomaly by comparing a velocity vector of one or more cameras coupled to the CA/AD system to a velocity vector of a CA/AD automobile including the one or more cameras. For example, embodiments include using optical flow along with an estimation such as Kalman filtering to predict autonomous vehicle motion vectors and compare the vectors with velocity vectors (determined from odometer readings). Specifically, in embodiments, the optical flow between two images captured from the same camera of a static object provides a dense feature correspondence between the images. In embodiments, this correspondence is used to compute a Fundamental/Homography matrix between the images and thereby allow computation of relative pose (Rotation and translation, t) between the images. In embodiments, the relative pose provides a velocity vector of the camera of the automobile between the two image captures and can be used to compute the vehicle velocity as well, if the camera location with respect the automobile remains fixed in the two image captures.

In various other embodiments, the consistency analysis unit detects an anomaly by computing a distance to a static object and comparing the distance with a LIDAR measurement included in image data from one or more of the cameras.

Figure 9:
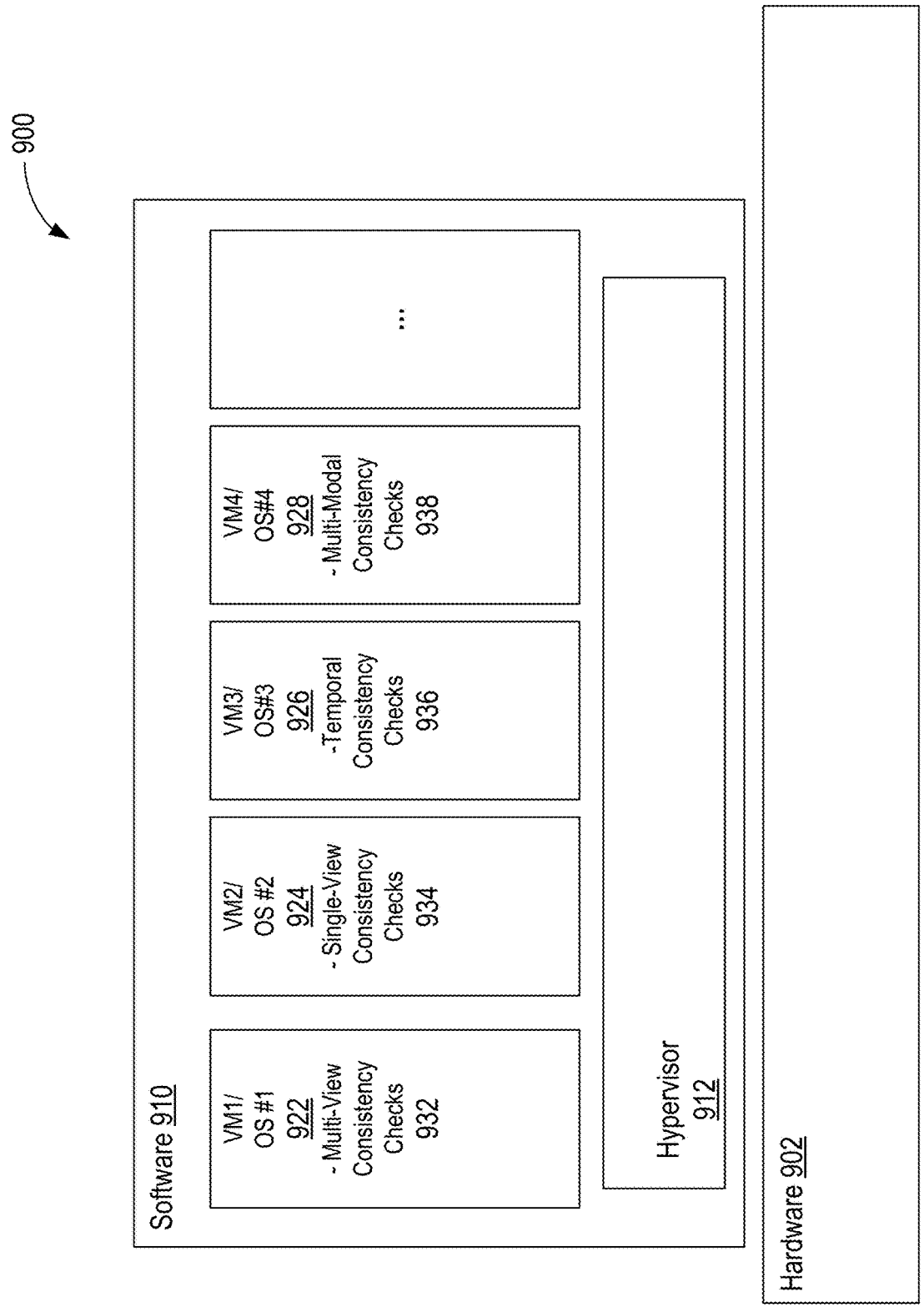
FIG. 9 is a software component view of a consistency analysis unit and coupled components, according to various embodiments.

Referring now to FIG. 9, wherein a software component view of a consistency analysis unit and coupled components according to various embodiments, is illustrated. As shown, for the embodiments, a consistency analysis unit 900, which could be consistency analysis unit 150, includes hardware 902 and software 910. In some embodiments, some or all of components of consistency analysis unit 900 as described above in connection with FIGS. 2-7 may be located remotely or in the cloud, e.g., cloud 58 of FIG. 1. For example, in some embodiments, software 910 includes hypervisor 912 hosting a number of virtual machines (VMs) 922-928. In embodiments, hypervisor 912 is configured to host execution of VMs 922-928. In embodiments, the VMs 922-928 may include, e.g., a VM 922, VM 924, VM 926, VM 928, having a respective first, second, third, and fourth operating system (OS) hosting execution of e.g., respective multi-view consistency check applications 932, single-view consistency checks 934, temporal view consistency checks 936, multi-modal consistency checks 938, and so forth. In embodiments, the applications may include execution of a number of consistency checks or operations to supplement or verify various operations of consistency analysis unit 150 located in vehicle 52.

Except for consistency analysis technology, e.g., as connected to consistency analysis unit 150 of the present disclosure, elements 922-928 of software 910 may be any one of a number of these elements known in the art. For example, hypervisor 912 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, OS' of VMs 922-928 may be any one of a number of OS known in the art, such as Linux, available e.g., from Red Hat Enterprise of Raleigh, N.C., or Android, available from Google of Mountain View, Calif.

Figure 10:
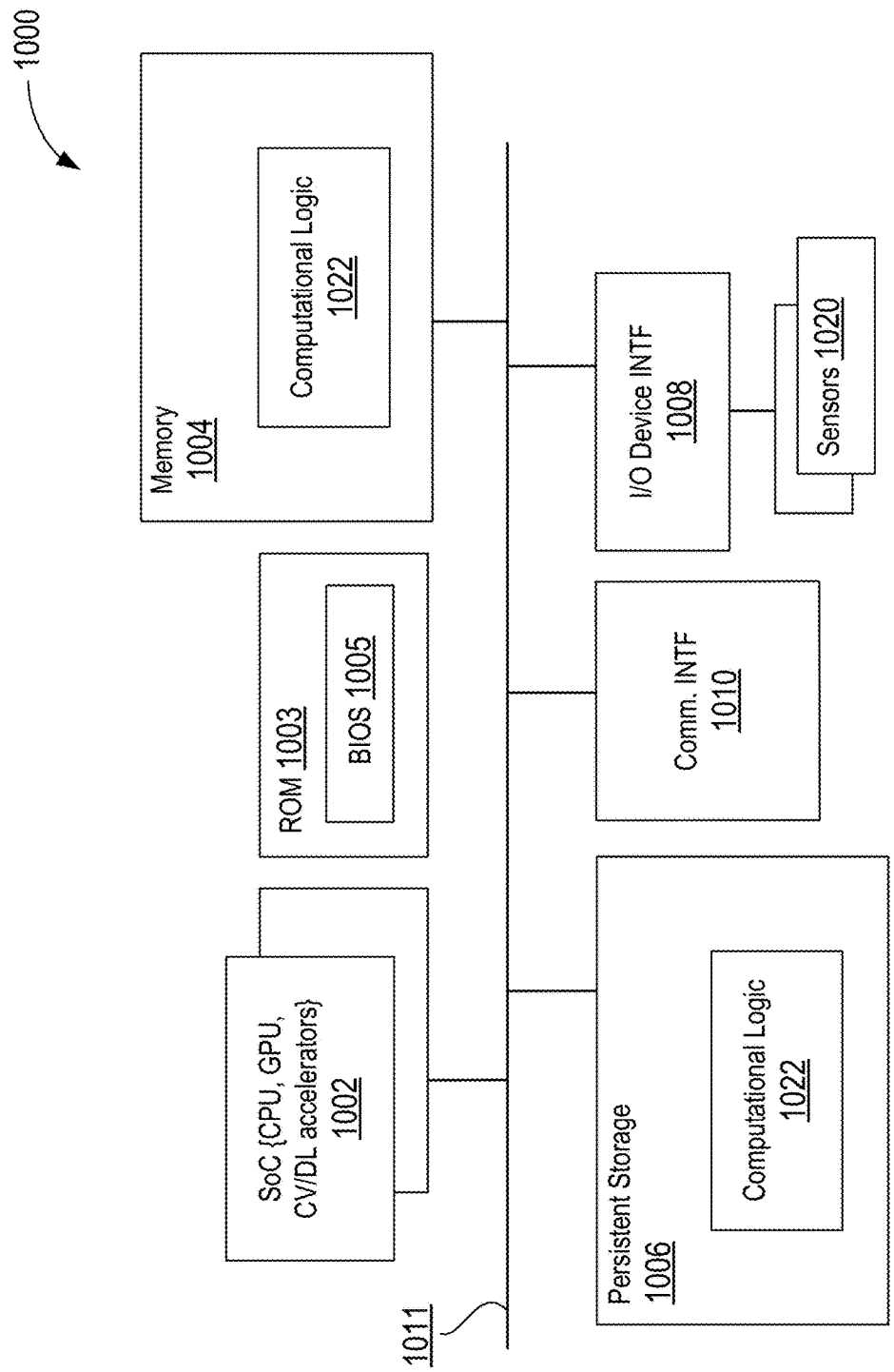
FIG. 10 illustrates an example computing device 1000 that may be suitable for use to practice selected aspects of the present disclosure, according to various embodiments.

FIG. 10 illustrates an example computing device 1000 that may be suitable for use to practice selected aspects of the present disclosure according to various embodiments. In embodiments, computing device 1000 or one or more components of computing device 1000 may be included in a CA/AD driving system of CA/AD vehicle or located remotely to assist the CA/AD driving system as described above in connection with to FIGS. 1-9. In embodiments, the CA/AD driving system may be included in a vehicle that is coupled to one or more cameras or sensors to capture a stream of image data including pixel-level data. In some embodiments, computing device 1000 may include a vehicle control system or onboard computer.

As shown, computing platform 1000, which may be hardware 902 of FIG. 9, may include one or more system-on-chips (SoCs) 1002, ROM 1003 and system memory 1004. Each SoCs 1002 may include one or more processor cores (CPUs), one or more graphics processor units (GPUs), one or more accelerators, such as computer vision (CV) and/or deep learning (DL) accelerators. ROM 1003 may include basic input/output system services (BIOS) 1005. CPUs, GPUs, and CV/DL accelerators may be any one of a number of these elements known in the art. Similarly, ROM 1003 and BIOS 1005 may be any one of a number of ROM and BIOS known in the art, and system memory 1004 may be any one of a number of volatile storage known in the art.

Additionally, computing platform 1000 may include persistent storage devices 1006. Example of persistent storage devices 1006 may include, but are not limited to, flash drives, hard drives, compact disc read-only memory (CD-ROM) and so forth. Further, computing platform 1000 may include input/output devices 1008 (such as display, keyboard, cursor control and so forth) and communication interfaces 1010 (such as network interface cards, modems and so forth). Communication and I/O devices 1008 may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1012, which may represent one or more buses. In the case of multiple buses, they may be bridged by one or more bus bridges (not shown).

Each of these elements may perform its conventional functions known in the art. In particular, ROM 1003 may include BIOS 1005 having a boot loader. System memory 1004 and persistent storage 1006 may be employed to store a working copy and a permanent copy of the programming instructions implementing the operations associated with hypervisor 902, consistency analysis unit 150 which may include or be coupled to an image signal processor (ISP) and/or one or more neural networks, collectively referred to as computational logic 1022. The various elements may be implemented by assembler instructions supported by processor core(s) of SoCs 1002 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 11:
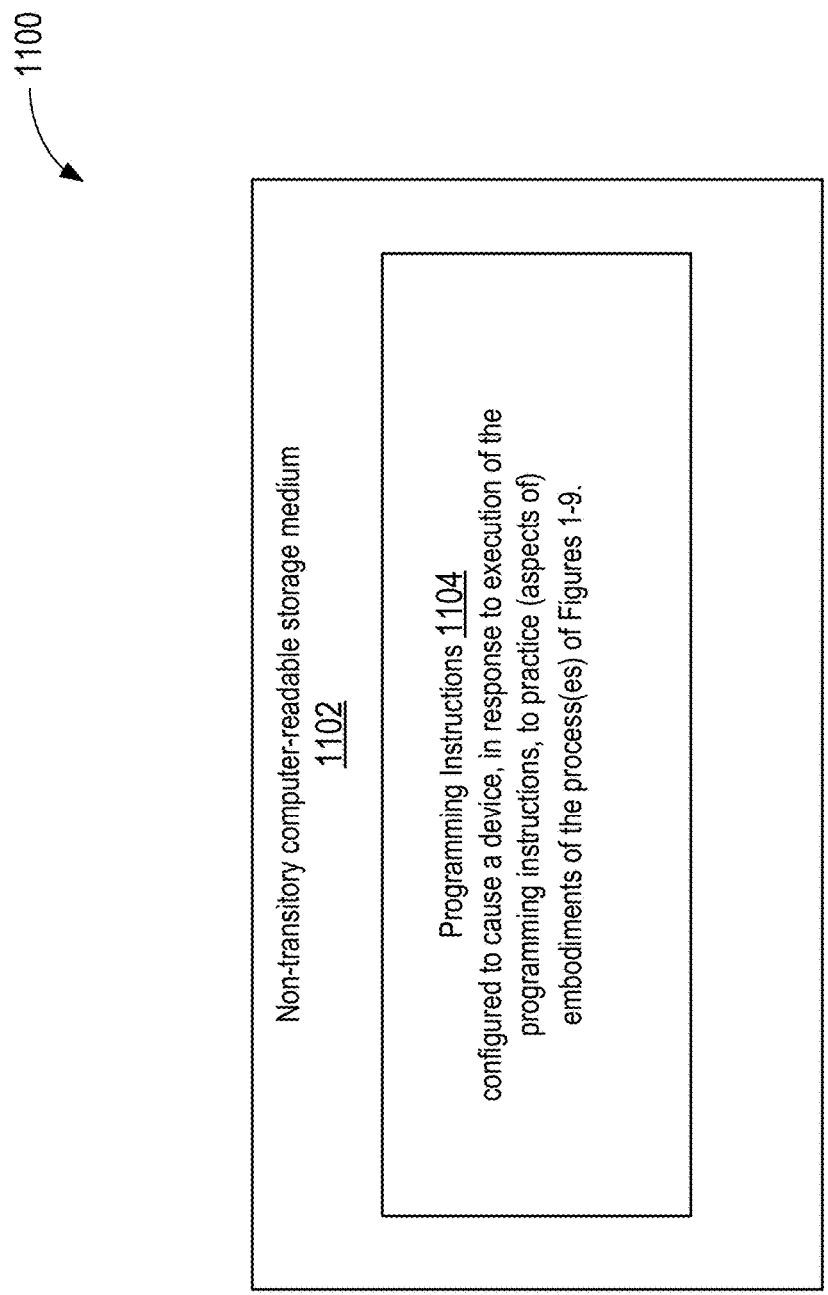
FIG. 11 illustrates an example computer-readable non-transitory storage medium 1102 that may be suitable for use to store instructions (or data that creates the instructions) that cause an apparatus, in response to execution of the instructions by the apparatus, to practice selected aspects of various embodiments.

Furthermore, the present disclosure may take the form of a computer program product or data to create the computer program, with the computer program or data embodied in any tangible or non-transitory medium of expression having the computer-usable program code (or data to create the computer program) embodied in the medium. FIG. 11 illustrates an example computer-readable non-transitory storage medium that may be suitable for use to store instructions (or data that creates the instructions) that cause an apparatus, in response to execution of the instructions by the apparatus, to practice selected aspects of the present disclosure. As shown, non-transitory computer-readable storage medium 1102 may include a number of programming instructions 1104 (or data to create the programming instructions). Programming instructions 1104 may be configured to enable a device, e.g., computing platform 1100, in response to execution of the programming instructions, to implement (aspects of) hypervisor 912, OS' of FIG. 9, and components of consistency analysis technology (such as consistency analysis unit 150 and so forth). In alternate embodiments, programming instructions 1104 (or data to create the instructions) may be disposed on multiple computer-readable non-transitory storage media 1102 instead. In still other embodiments, programming instructions 1104 may be disposed on computer-readable transitory storage media 1102, such as, signals.

In embodiments, the instructions or data that creates the instructions causes a device to analyze for inconsistencies indicative of an anomalous image, pixel-level data associated with a stream of image data, wherein the stream of image data is single image data received from one or more cameras coupled to the CA/AD system or multi-view image data received from multiple ones of the one or more cameras coupled to the CA/AD system; and based at least in part on a weighted value corresponding to the analysis of the pixel-level data, determine whether one or more inconsistencies indicate the anomalous image.

Any combination of one or more computer usable or computer readable medium(s) may be utilized. The computer-usable or computer-readable medium may be, for example but not limited to, one or more electronic, magnetic, optical, electromagnetic, infrared, or semiconductor system, apparatus, device, or propagation media. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code(such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the Program code (or data to create the program code) may need to be configured (e.g., settings stored, data input, network addresses recorded, etc.) before the program code (or data to create the program code) can be executed/used in whole or in part. Thus, the disclosed Program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Some non-limiting Examples are provided below:

Example 1 is an apparatus to detect an anomalous image associated with image data from one or more cameras of a computer-aided or autonomous driving (CA/AD) vehicle, comprising a sensor interface disposed in the CA/AD vehicle to receive, from the one or more cameras, a stream of image data including single view image data captured by the one or more cameras or multi-view image data collaboratively captured by multiple ones of the one or more cameras; and a consistency analysis unit disposed in the CA/AD vehicle and coupled to the sensor interface to perform a consistency check on pixel-level data using single view or multi-view geometric methods to determine whether the image data includes an anomalous image.

Example 2 is the apparatus of Example 1, wherein the consistency analysis unit is to determine whether the image data includes the anomalous image based at least in part on a value that is related to a statistical combination of weights and wherein the weights are related to different types of consistency checks and are assigned to an output of the consistency checks.

Example 3 is the apparatus of Example 2, wherein the weights related to the different consistency checks are determined via learning from ground truth anomalous example images or examples associated with ground truth anomalous images and which indicate a likelihood of accuracy of the consistency checks.

Example 4 is the apparatus of Example 1, wherein to perform the consistency check on the pixel-level data using the single view or multi-view geometric methods includes further to perform temporal and multi-modal consistency checks.

Example 5 is the apparatus of Example 1, wherein the consistency check to be performed is based on single view image data and is based at least in part upon detection of line and shadow inconsistencies indicated by the pixel-level data.

Example 6 is the apparatus of Example 1, further comprising the one or more cameras coupled to the CA/AD vehicle to capture image data proximate to the CA/AD vehicle.

Example 7 is the driving apparatus of Example 1, wherein the CA/AD driving apparatus comprises the CA/AD vehicle and wherein the driving elements include one or more of an engine, electric motor, braking system, drive system, wheels, transmission, and a battery Example 8 is the apparatus of Example 1, further including an image signal processor (ISP) coupled to receive the pixel-level data from the consistency analysis unit and wherein the consistency analysis unit is to perform the consistency check by comparing color statistics of a raw BAYER pattern image of the pixel-level data and a BAYER pattern image generated by the ISP.

Example 9 is the driving apparatus of Example 1, wherein the consistency check is to be performed using multi-view geometric methods and includes comparing image data related to a common object included in a common field of view of at least two cameras of the multiple cameras.

Example 10 is the driving apparatus of Example 9, wherein comparing image data related to a common object comprises comparing a relative rotation and translation parameter determined from image data of the at least two cameras to rotation and translation parameters intrinsic to the at least two cameras.

Example 11 is the apparatus of Example 9, wherein comparing image data comprises comparing a disparity cost of a region in multi-view image data to a stored disparity cost associated with at least two cameras associated with the multi-view image data.

Example 12 is the apparatus of Example 1, wherein performing the consistency check includes detecting anomalies by comparing a first 3D reconstruction determined from first multi-view image data with a second 3D reconstruction determined from second multi-view image data.

Example 13 is the apparatus of Example 1, wherein the consistency analysis unit is to perform the consistency check by matching a feature location determined from the image data to feature location determined from GPS data.

Example 14 is the apparatus of Example 1, wherein the consistency analysis unit to perform the consistency check on the pixel-level data using the single view or multi-view geometric methods includes to perform the consistency check on image data received from the CA/AD vehicle and image data received from at least one other CA/AD vehicle.

Example 15 is the apparatus of any of Examples 13-15, wherein the consistency analysis unit is further to compare image data received from a satellite to image data from the CA/AD vehicle and/or image data received from the at least one other CA/AD vehicle.

Example 16 is a method to detect an anomalous image in image data associated with one or more cameras of a computer-aided or autonomous driving (CA/AD) vehicle, the method comprising: determining, by a consistency analysis unit disposed in the CA/AD vehicle, whether a consistency check is to be performed on pixel-level data of the image data, using one or more of single view or multi-view geometric methods; receiving from one or more of the cameras, the image data including single view image data captured by one or more cameras of the CA/AD vehicle and/or multi-view image data captured by multiple cameras of the CA/AD vehicle; and performing by the consistency analysis unit, the consistency check on the pixel-level data using the single view or multi-view geometric methods to determine if the image data includes an anomalous image.

Example 17 is the method of Example 16, further comprising, determining whether the image data includes the anomalous image based at least in part on weights assigned to an output of one or more consistency checks.

Example 18 is the method of Example 17, wherein the weights assigned to an output of one or more of the consistency checks are computed empirically or learned during training of a neural network.

Example 19 is the method of Example 13, wherein performing by the consistency analysis unit, the consistency check includes detection of line and shadow inconsistencies indicated by the pixel-level data Example 20 is the method of any one of Examples 16-20, wherein performing by the consistency analysis unit, the consistency check includes comparing image data related to a common object included in a common field of view of at least two cameras of the multiple cameras.

Example 21 is one or more non-transitory computer-readable media containing instructions stored thereon to cause a computer-aided or autonomous driving (CA/AD) system, in response to execution of the instructions, to analyze for inconsistencies indicative of an anomalous image, pixel-level data associated with a stream of image data, wherein the stream of image data is single image data received from one or more cameras coupled to the CA/AD system or multi-view image data received from multiple ones of the one or more cameras coupled to the CA/AD system; and based at least in part on a weighted value corresponding to the analysis of the pixel-level data of the single image data or the multi-view image data, determine whether one or more inconsistencies indicate the anomalous image.

Example 22 is the computer-readable media of Example 21, wherein the instructions to determine whether one or more inconsistencies indicate the anomalous image include instructions to determine a weight corresponding to the analysis of the pixel-level data of the single image data or the multi-view image data according to a single-layer perceptron.

Example 23 is the computer-readable media of Example 21, wherein the instructions to analyze for inconsistencies, the pixel-level data, includes instructions to detect a change in a gradient of pixel locations of keypoints associated with the stream of image data.

Example 24 is the computer-readable media of Example 21, wherein the instructions to analyze for inconsistencies, the pixel-level data, include instructions to compare a temporal profile of a same keypoint that is visible in the multiple ones of the one or more cameras.

Example 25 is the computer-readable media of Example 21, wherein the instructions to analyze for inconsistencies, the pixel-level data, further include instructions to analyze a transformation of a shape of an object according to a speed and direction of a computer-aided or autonomous driving (CA/AD) automobile including the CA/AD system.

Example 26 is the computer-readable media of Example 21, wherein the instructions to analyze for inconsistencies, the pixel-level data, include instructions to compare a velocity vector of one or more cameras coupled to the CA/AD system to a velocity vector of a CA/AD automobile including the one or more cameras.

Example 27 is the computer-readable media of Example 21, wherein the instructions to analyze for inconsistencies, the pixel-level data, include instructions to compute a distance from a computer-aided or autonomous driving (CA/AD) automobile including the CA/AD system to a static object and compare the distance with a LIDAR measurement included in image data from one or more of the cameras.

Example 28 is the computer-readable media of any one of Examples 21-27, wherein the instructions to determine whether one or more inconsistencies indicate the anomalous image include instructions to determine a weight according to a neural network.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:

1. An apparatus employed as a vehicular computer system (VCS) to detect anomalies in image data from one or more image sensors disposed on or in a vehicle, the apparatus comprising:
   sensor interface circuitry to receive, from the one or more image sensors, a stream of image data including a set of images representing at least one object; and
   processor circuitry coupled to the sensor interface, the processor circuitry to perform a consistency check on pixel-level data using a geometric method to determine whether the image data includes an anomalous image, the anomalous image including a representation of the at least one object that is a deviation from an expected transformation of the at least one object.

2. The apparatus of claim 1, wherein, to perform the consistency check, the processor circuitry is further to:
   operate a set of consistency check blocks, wherein each consistency check block corresponds to a consistency check analysis that is different than other consistency check analyses of other consistency check blocks of the set of consistency check blocks, and each consistency check block is to output respective weight values that indicate an accuracy of the consistency check blocks from which they are output; and
   determine whether the image data includes the anomalous image based at least in part on a value that is related to a statistical combination of the respective weights.

3. The apparatus of claim 2, wherein the respective weight values are determined via a learning process using a set of images wherein each image in the set of images is labeled as anomalous or non-anomalous.

4. The apparatus of claim 2, wherein the set of consistency check blocks includes a multi-view consistency check, a single-view consistency check, a temporal consistency check, and multi-modal consistency check.

5. The apparatus of claim 1, wherein the image data is single-view image data that is obtained from individual image sensors of the one or more image sensors, the geometric method is a single-view geometric method, and the consistency check to be performed is based at least in part upon detection of line and shadow inconsistencies indicated by the pixel-level data.

6. The apparatus of claim 1, further comprising the one or more image sensors coupled to the VCS to capture image data proximate to the VCS.

7. The apparatus of claim 1, wherein a computer assissted or automated driving (CA/AD) vehicle comprises the CVCS and wherein the driving elements include one or more of an engine, electric motor, braking system, drive system, wheels, transmission, and a battery.

8. The apparatus of claim 1, wherein the image data is multi-view image data that is collaboratively captured by multiple image sensors of the one or more image sensors, the consistency check is to be performed using one or more multi-view geometric methods and, and the consistency check includes a comparison of image data related to a common object included in a common field of view of at least two image sensors of the multiple image sensors.

9. The apparatus of claim 8, wherein, to compare the image data related to a common object, the processor circuitry is to compare a relative rotation and translation parameter determined from image data of the at least two image sensors to rotation and translation parameters intrinsic to the at least two image sensors.

10. The apparatus of claim 8, wherein, to compare the image data, the processor circuitry is to compare a disparity cost or computed disparity values of a region in multi-view image data to a stored disparity cost associated with at least two image sensors associated with the multi-view image data.

11. The apparatus of claim 1, wherein, to perform the consistency check, the processor circuitry is to match a feature location determined from the image data to the feature location determined from GPS data.

12. The apparatus of claim 1, wherein, to perform the consistency check on the pixel-level data, the processor circuitry is to perform the consistency check on image data received from the one or more image sensors disposed in or on the vehicle and image data received from at least one other VCS disposed in another vehicle.

13. The apparatus of claim 11, wherein the processor circuitry is further to compare image data received from a satellite to image data from the one or more image sensors and image data received from the at least one other VCS.

14. A method to detect anomalies in image data, the method comprising:
   receiving, by a vehicular computer system (VCS) from a set of image sensors disposed in or on a vehicle, a stream of image data, the stream of image data including a set of images representing at least one object captured by respective image sensors of the set of image sensors;
   determining, by the VCS, whether a consistency check should be performed on pixel-level data of the image data using one or more geometric methods; and
   performing, by the VCS, the consistency check on the pixel-level data using the at least one geometric method of the one or more geometric methods to determine if the image data includes an anomalous image, the anomalous image including a representation of the at least one object that is a deviation from an expected transformation of the at least one object.

15. The method of claim 14, further comprising:
   operating a set of consistency check blocks, wherein each consistency check block corresponds to a consistency check analysis that is different than other consistency check analyses of other consistency check blocks of the set of consistency check blocks; and
   determining whether the image data includes the anomalous image based at least in part on weights output by the set of consistency check blocks, the weights indicating an accuracy of the consistency check blocks from which they are output.

16. The method of claim 15, wherein the weights are computed using a theoretical analysis, a statistical analysis over a number of noisy synthetic images without anomalies, an empirical analysis, or learned during training of a neural network.

17. The method of claim 14, wherein the image data is single-view image data captured by at least one image sensor of the set of image sensors, and performing the consistency check comprises: detecting line and shadow inconsistencies indicated by the pixel-level data.

18. The method of claim 14, wherein the image data is multi-view image data collaboratively captured by at least two image sensors of the set of image sensors, and performing the consistency check comprises: comparing image data related to a common object included in a common field of view of the at least two image sensors.

19. One or more non-transitory computer-readable media (NTCRM) comprising instructions stored thereon, wherein execution of the instructions by one or more processors of a vehicular computer system (VCS) is to cause the VCS to:
    analyze pixel-level data for inconsistencies indicative of an anomalous image, wherein the pixel-level data is from a stream of image data obtained from a set of image sensors disposed in or on a vehicle that includes the VCS, wherein the stream of image data is one of single-view image data obtained from individual image sensors of the set of image sensors or multi-view image data obtained from multiple image sensors of the set of image sensors; and
    based at least in part on a weighted value corresponding to the analysis of the pixel-level data, determine whether one or more inconsistencies indicate the anomalous image.

20. The one or more NTCRM of claim 19, wherein, to determine whether one or more inconsistencies indicate the anomalous image, execution of the instructions is to further cause the VCS to determine one or more weights corresponding to the analysis of the pixel-level data of the image data according to a multi-layer perceptron or a support vector machine.

21. The one or more NTCRM of claim 19, wherein, to analyze for inconsistencies, execution of the instructions is to further cause the VCS to detect a change in a gradient of pixel locations of keypoints associated with the stream of image data.

22. The one or more NTCRM of claim 19, wherein, to analyze for inconsistencies, execution of the instructions is to further cause the VCS to compare a temporal profile of a same keypoint that is visible in multi-view image data from multiple ones of the set of image sensors.

23. The one or more NTCRM of claim 19, wherein, to analyze for inconsistencies, execution of the instructions is to further cause the VCS to analyze a transformation of a shape of an object according to a speed and direction of the vehicle.

24. The one or more NTCRM of claim 19, wherein, to analyze for inconsistencies, execution of the instructions is to further cause the VCS to compare a velocity vector of the set of image sensors to a velocity vector of the vehicle.

* * * * *

UNITED STATES PATENT AND TRADEMARK OFFICE
CERTIFICATE OF CORRECTION

PATENT NO. : 11,148,676 B2
APPLICATION NO. : 16/369898
DATED : October 19, 2021
INVENTOR(S) : Kumar et al.

Page 1 of 1

It is certified that error appears in the above-identified patent and that said Letters Patent is hereby corrected as shown below:

In the Claims

Column 20
Line 1, "...assissted..." should read – "...assisted..."

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*